United States Patent
Cami et al.

(10) Patent No.: US 9,491,380 B2
(45) Date of Patent: Nov. 8, 2016

(54) METHODS FOR TRIGGERING FOR MULTI-CAMERA SYSTEM

(71) Applicant: SEMICONDUCTOR COMPONENTS INDUSTRIES, LLC, Phoenix, AZ (US)

(72) Inventors: Sergi Cami, Thacham (GB); Peter Hall, Surrey (GB)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 111 days.

(21) Appl. No.: 14/485,549

(22) Filed: Sep. 12, 2014

(65) Prior Publication Data

US 2015/0077601 A1   Mar. 19, 2015

Related U.S. Application Data

(60) Provisional application No. 61/877,449, filed on Sep. 13, 2013.

(51) Int. Cl.
*H04N 5/353* (2011.01)
*H04N 5/376* (2011.01)

(52) U.S. Cl.
CPC .......... *H04N 5/3532* (2013.01); *H04N 5/3765* (2013.01)

(58) Field of Classification Search
None
See application file for complete search history.

(56) References Cited

U.S. PATENT DOCUMENTS

| | | | |
|---|---|---|---|
| 5,978,023 A * | 11/1999 | Glenn | H04N 7/0132 348/234 |
| 6,999,374 B2 | 2/2006 | Cho | |
| 7,483,213 B2 * | 1/2009 | Pochapsky | G03B 33/12 250/330 |
| 8,085,321 B2 | 12/2011 | Xu et al. | |
| 8,124,936 B1 * | 2/2012 | Lagna | G01J 3/00 250/339.01 |
| 2006/0157760 A1 * | 7/2006 | Hayashi | G03B 7/00 257/293 |
| 2006/0164533 A1 * | 7/2006 | Hsieh | H01L 27/14632 348/317 |
| 2007/0052839 A1 * | 3/2007 | Kong | G03B 7/08 348/364 |
| 2014/0085518 A1 | 3/2014 | Fox | |

* cited by examiner

*Primary Examiner* — Mark T Monk
(74) *Attorney, Agent, or Firm* — Treyz Law Group, P.C.; Vineet Dixit; Joseph F. Guihan

(57) ABSTRACT

A system may include one or more camera modules each containing one or more image sensors. The system may be configured to capture images from light spectra outside the visible band. Therefore, the pixel integration times, and frame rates of the one or more image sensors may be unique and distinct. An image sensor may respond to a trigger control signal by beginning integration of a subset of pixels some duration after an appropriate trigger control signal transitions from low to high. The image sensor may output the frame captured by the pixels a predetermined duration after the trigger control signal transitions, to ensure a deterministic response. Pixels used to generate the image of a subsequent frame may begin integrating during the readout of the current frame. The pixels may be integrated for exactly their programmed integration time, even when the frame rate is varied.

20 Claims, 7 Drawing Sheets

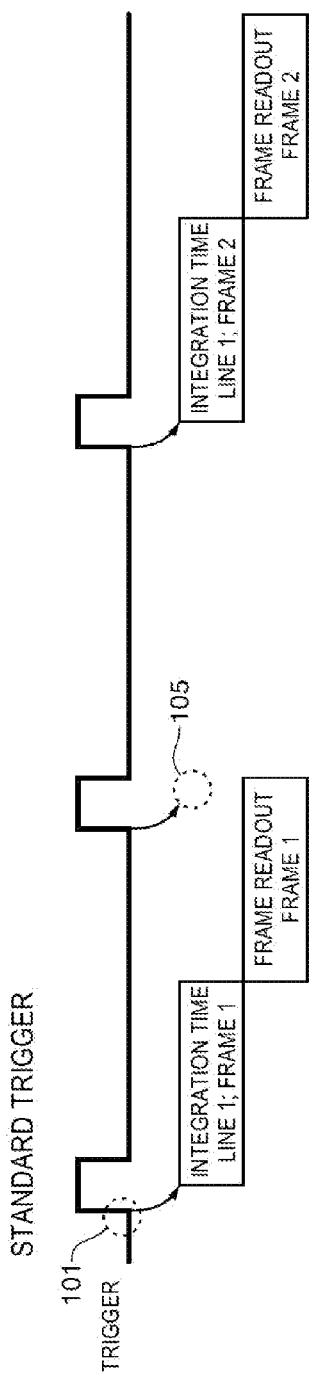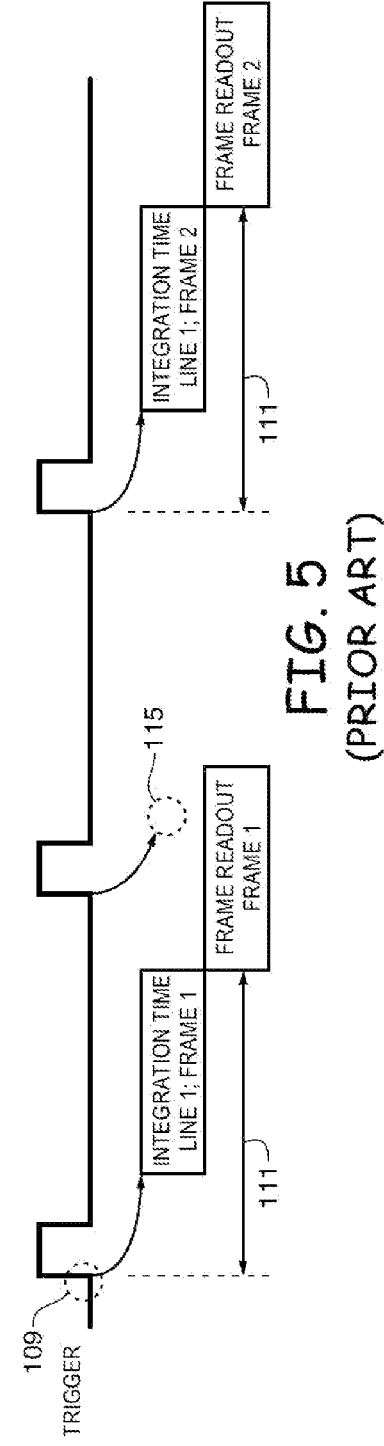

METHODS FOR TRIGGERING FOR MULTI-CAMERA SYSTEM

This application claims the benefit of provisional patent application No. 61/877,449 filed on Sep. 13, 2013, which is hereby incorporated by reference herein in its entirety.

BACKGROUND

This relates generally to imaging devices, and more particularly to imaging devices that use imaging sensors that gather scene image data using an electronic rolling shutter.

Modern electronic devices such as cellular telephones, cameras, and computers often use digital image sensors. Image sensors may be formed from a two-dimensional array of image sensing pixels. Each pixel receives incident photons (light) and converts the photons into electrical signals. Image sensors may program the duration of the exposure of a pixel to incident light before reading the electrical signals produced by the pixel. The period of time wherein a pixel is exposed to incident light after being reset is called the integration time. A pixel may be reset, after the electrical signal it produced has been read. After a pixel is reset, it may be used to collect light information about a scene, again.

The timing and duration of pixel integration, readout, and reset operations may be directly or indirectly controlled by control circuitry. The control circuitry may respond to a trigger control signal. The response of control circuitry to a trigger control signal may differ based on its operating mode, which may be determined by the user or by constraints of particular system implementations.

As the amount of data processed by a camera system increases, subtle differences in the response of control circuitry to a trigger control signal may determine the performance of the system. An imaging system may use multiple image sensors in one or more camera devices to capture images with a large field of view. An imaging system may use multiple cameras to capture images at different frame rates or at different resolutions, to gain insight into different aspects of the imaged scene while minimizing the amount of data needed to capture the relevant information. Embodiments of such multi-camera systems may be used in autonomous vehicles which use both visible and infrared cameras to capture information about the surrounding scene. Embodiments of such multi-camera imaging systems may be used in multispectral or hyperspectral imagers, which capture data about multiple bands of the electromagnetic spectrum.

Due to their high system throughput, the usability of a multi-camera system may be impeded if its control circuitry's responses to trigger control signals are non-deterministic. Due to their applicability in imaging dynamic scenes such as the environment around an autonomous vehicle, the efficacy of multi-camera systems may be lessened if the systems are incapable of varying frame rates without any image quality artifacts.

It would therefore be desirable to provide an improved operating mode or response to a trigger control signal for multi-camera systems.

BRIEF DESCRIPTION OF THE DRAWINGS

FIG. 4 is a timing diagram illustrative of a prior art implementation of a standard mode trigger response.

FIG. 5 is a timing diagram illustrative of a prior art implementation of a constant delay mode trigger response.

DETAILED DESCRIPTION

Digital camera modules are widely used in electronic devices. Electronic devices such as digital cameras, computers, cellular telephones, and other electronic devices include image sensors that gather incoming image light to capture an image. An image sensor may include an array of imaging pixels. The imaging pixels may include photosensitive elements such as photodiodes that convert the incoming image light into image signals. The Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

The period of time wherein a pixel is exposed to incident light after being reset is called the integration time. The integration of a pixel, the reading out of its electrical signal and its resetting may be controlled by a control signal known as a trigger. The response of control circuitry to the trigger control signal may vary according to different operating modes of the camera device. A trigger may directly or indirectly control digital or analog circuitry on the image sensor used to store the values of electrical signals generated by the pixels' exposure to light. A trigger may also control circuitry on the image sensor used to reset a subset of the pixels on the sensor, preparing them for another period of light capture. The length of certain image sensor operations, such as exposing a pixel to incident light may be bounded by a minimum threshold. If a light capture period is specified below the minimum threshold, the quality of the resultant image may suffer.

The time required to readout and store the values of a row of pixels that have been sufficiently integrated may be constrained by minimum delays in the readout circuitry on the image sensor. These minimum delays may include signal propagation delays in the circuitry. In some implementations of image sensors comprising of CMOS imaging pixels a control technique known as a rolling shutter may be used to obtain image data from the pixel array. In this technique, the pixels of one row begin integration some period of time after the previous row begins integrating. The delay between the start of the integration of a first row and a second row may be timed so that the readout of the first row following its complete integration is completed just as the second row completes its integration.

Figure 1:
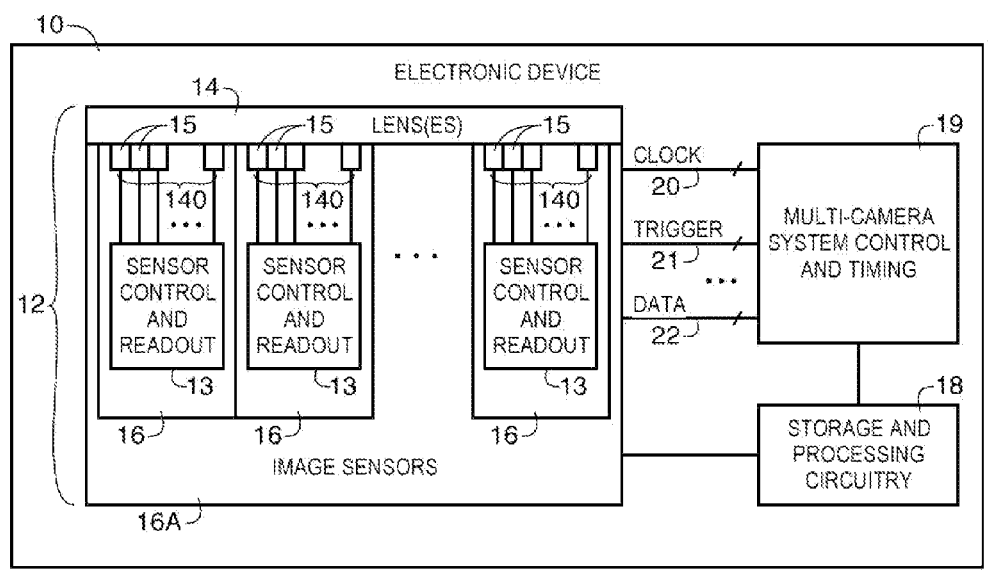
FIG. 1 is a diagram of an illustrative multi-camera imaging system with an array of image sensors in accordance with embodiments of the present invention.

FIG. 1 is a diagram of an illustrative electronic device that uses one or more image sensors to capture images. Electronic device 10 of FIG. 1 may be a portable electronic device such as a camera, a cellular telephone, a video camera, or other imaging device that captures digital image data. Electronic device 10 may include a camera module such as camera module 12 for converting incoming light into digital image data.

Camera module 12 may include an image sensor array such as image sensor array 16A having an array of image sensors 16. Camera module 12 may be known as a multi-camera system if it contains more than one image sensor 16. One or more lenses such as lenses 14 may be used to focus incoming light onto image sensors 16. If desired, a single lens 14 may cover the entire array 16A of image sensors 16 or each image sensors 16 may be covered by a respective lens 14. Each image sensor 16 may include an image pixel array 40 with an array of image sensor pixels 15. Each image sensor 16 may include a protective transparent cover layer formed over the array of image sensor pixels 15. The transparent cover layer may be interposed between pixel arrays 40 and lenses 14. Image sensors 16 may include one or more backside illumination (BSI) image sensors and/or one or more front side illumination (FSI) image sensors.

There may be any suitable number of lenses in lens array 14 and any suitable number of image sensors in image sensor array 16A. Lens array 14 may, as an example, include N*M individual lenses arranged in an N×M one-dimensional or two-dimensional array. The values of N and M may be one, two, three, greater than three, greater than 10, etc. Image sensor array 16A may contain a corresponding N×M one-dimensional or two-dimensional array of image sensors 16. The image sensors may be formed on one or more separate semiconductor substrates. With one suitable arrangement, which is sometimes described herein as an example, the image sensors are formed on one common semiconductor substrate (e.g., a common silicon image sensor integrated circuit die). The image sensors may be identical to each other or there may be different types of image sensors in a given image sensor array integrated circuit. One or more of the image sensors may be a Video Graphics Array (VGA) sensor with a resolution of 480×640 sensor pixels (as an example). If desired, images sensors with greater than VGA resolution (e.g., high-definition image sensors) or less than VGA resolution may be used.

If desired, one or more image sensors 16 in image sensor array 16A may be monochromatic. For example, image sensor array 16A may include a red image sensor having an array of red imaging pixels, a green image sensor having an array of green imaging pixels, and a blue image sensor having an array of blue imaging pixels. As additional examples, one or more image sensors 16 may include a color filter array having a Bayer pattern, one or more image sensors 16 may include one or more infrared imaging pixels, or one or more image sensors 16 may include pixel arrays that are formed exclusively with infrared imaging pixels (as examples). In general, image sensors 16 may include imaging pixels having any suitable spectral sensitivity.

During image capture operations, light from a scene may be focused onto image sensor array 16A using one or more lenses 14. Sensor control and readout circuitry 13 may be used to reset the electrical signal associated with the charge stored in an individual image sensor pixel 15 or a row of pixels 15. Sensor control and readout circuitry 13 may be used to control the integration time of a row of pixels 15. Sensor control and readout circuitry 13 may be used to readout the values stored in a row of pixels 15. Sensor control and readout circuitry 13 may receive inputs from the multi-camera system control and timing circuitry 19 (sometimes referred to herein as system control circuitry 19). System control circuitry 19 may output a common set of signals to the image sensors 16A, or individualized signals for each particular image sensor 16.

Clock signal 20 may be a signal whose size or width may be proportional to N*M if each individual image sensor 16 requires a unique clock signal. Clock signal 20 may also be shared between image sensors 16A. Clock signal 20 or a relevant subset may be used by image sensor control and readout circuitry 13 to time integration, readout and reset operations.

Trigger signal 21 may be a signal having a size or width proportional to N*M if each individual image sensor 16 requires a unique trigger signal. Trigger signal 21 may also be shared between image sensors 16A. Trigger signal 21 or a relevant subset may control how and when sensor control and readout circuitry 13 to starts and controls the integration, readout and reset operations for the rows of pixels 15 that comprise image sensor 16.

Data signal 22 may be proportional to N*M if each individual image sensor 16 requires a unique data signal. Data signal 22 may also be shared between image sensors 16A. Data signal 22 may determine the operating mode of an image sensor 16. The operating mode may be stored on the image sensor 16 or asserted every clock cycle. The operating modes of image sensor 16 may relate to the readout behavior of the image sensor 16. For example, data signal 22 may convey instructions to image sensor 16 to subsample the image data by skipping every other set of two columns of image data during the readout operations.

Image sensor 16 may provide corresponding digital image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
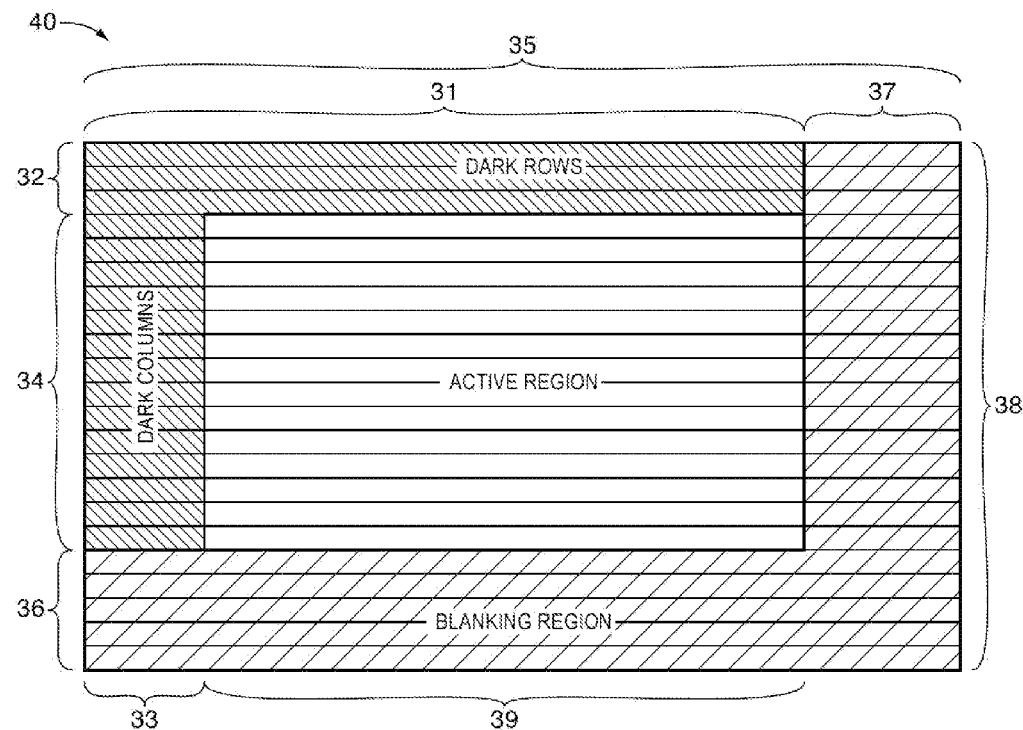
FIG. 2 is a diagram of an illustrative pixel array having dark and blanking regions surrounding the active pixel sensor array in accordance with embodiments of the present invention.

FIG. 2 is an illustrative diagram of an image sensor with an active pixel region surrounded by dark and blanking regions. The dark region is bounded by areas 31-32 and 33-34. The dark region may be used to determine offsets to fine tune a row's black level. The values in the dark regions may be readout by the image sensor control and readout circuitry if the system control circuitry 19 conveys instructions to do so in its data signal 22.

The boundary or blanking region is bounded by areas 35-36 and 37-38. The blanking region may be read out with the active region image data, which is bound by areas 34 and 39. The blanking region is not passive, and may be used to prevent edge effects when generating an image that uses the entire frame of pixels in the active region.

The arrangement and placement of blanking and dark regions illustrated in FIG. 2 may differ in different embodiments of the present invention. For example, the active region may be surrounded on all four sides by a blanking region, which in turn is surrounded on all four sides by a dark region.

Figure 3:
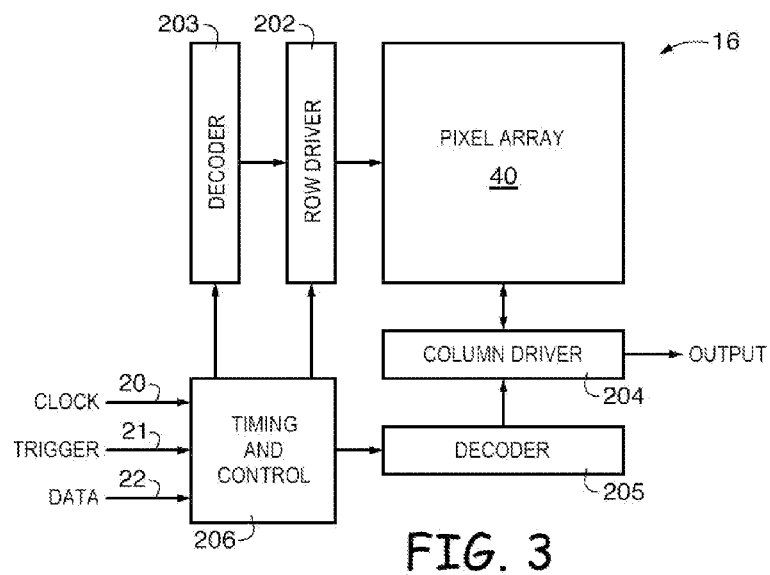
FIG. 3 is a block diagram of an illustrative image sensor with accompanying control circuitry in accordance with embodiments of the present invention.

FIG. 3 is a diagram of an image sensor 16 illustrating a possible configuration of a pixel array 40 and the control circuitry 202-206 that may accompany the pixel array. Sensor control and readout circuitry 13 of FIG. 1 may comprise of the control circuitry 202-206. Timing and control circuitry 206 may receive signals 20-22, or a relevant subset of the same from system control circuitry 19. The beginning of image capture operations or pixel data readout may be controlled by trigger signal 21. Before image capture operations, timing and control circuitry 206 may be used to select the first row address by sending the row address to the row address decoder 203 which in turn outputs the appropriate select line in row driver 202. The column driver 204 may then reset the row of values by activating a reset transistor on the selected image sensor pixels 15. Once a given rows of pixels is reset, it is ready to receive light signals and convert the incident light to an electrical signal during its integration phase. After a row has been reset and allowed to begin integrating, the following row may be reset and allowed to begin integrating.

The row lines may be selectively activated by row driver 202 in response to row address decoder 203 and the column select lines may be selectively activated by column driver 204 in response to column address decoder 205. Thus, a row and column address is provided for each pixel.

Image sensor 16 may be operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals may be output to storage and processing circuitry 18 to undergo amplification, noise correction, digital conversion or other processing.

FIG. 4 illustrates the response of an image sensor 16 to a prior art trigger mode herein referred to as the standard trigger mode. The standard trigger mode is intended for single frame readout. After the trigger signal 21 transitions from 0 to 1 as shown in event 101, the image sensor 16 commences integration of the first line or row of pixel array 40. After the first row of pixel array 40 has been integrated, it proceeds to be readout. After the readout of the first line of the frame, the rest of the rows of the frame, which have been integrating successively after the first row in accordance with the rolling shutter technique, are readout.

In the standard trigger mode, if trigger signal 21 transitions from 0 to 1 during a readout operation, the image sensor 16 will not respond in any way to the trigger input, as seen in event 105. The standard trigger mode does not recognize subsequent inputs until it has completed the readout associated with the first trigger signal transition from 0 to 1. Upon completing the readout associated with the first trigger signal transition, the sensor returns to standby mode, where it can be retriggered.

FIG. 5 illustrates the response of an image sensor 16 to a prior art trigger mode herein referred to as the constant delay trigger mode. After the trigger signal 21 transitions from 0 to 1 as shown in the event 109, the image sensor 16 delays the readout of the frame consistently for a duration 111 which may be determined or proportional to the number of rows (rows 38, FIG. 2) in the frame. The integration of the first row of the first frame is timed to start such that it ends just as the readout of frame 1 (starting with the readout of the first row) is scheduled to start (a duration 111 after the trigger signal 21 transitions from 0 to 1).

In the constant delay trigger mode, if trigger signal 21 transitions from 0 to 1 during a readout operation, the image sensor 16 will not respond in any way to the trigger input, as seen in event 115. The constant delay trigger mode does not recognize subsequent inputs until it has completed the readout associated with the first trigger signal transition from 0 to 1. Upon completing the readout associated with the first trigger signal transition, the sensor returns to standby mode, where it can be retriggered.

Figure 6:
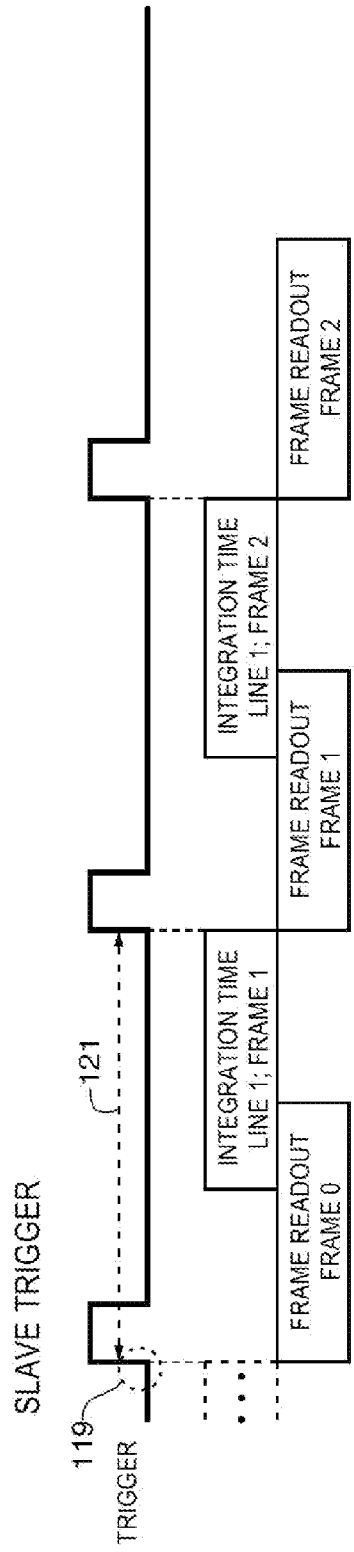
FIG. 6 is a timing diagram illustrative of a prior art implementation of a slave mode trigger response.

FIG. 6 illustrates the response of an image sensor 16 to a prior art trigger mode herein referred to as the slave trigger mode. Trigger signal 21 does not directly control the integration of the first line in this mode. Once trigger signal 21 transitions from 0 to 1 as shown in event 119, the image sensor will begin the readout operation for the last recorded frame. While a frame is being read out, selected rows that will form the image of the next frame are reset and set to integrate. After a frame is read out, the system will halt the further integration of rows that will form the next frame, and wait for a trigger signal 21 transition from 0 to 1, to commence readout of the next frame. Readout of the next frame is possible because during the readout of the previous frame, some rows are set to integrate. If a given row was reset and set to integrate before the last row of the previous frame was read out, it will continue integrating beyond its programmed integration period until timing and control circuitry 16 detects a subsequent trigger signal transition. When the timing control circuitry 16 detects a subsequent trigger signal transition, it will read out the rows set to integrate during the readout of the previous frame which may have been over integrated.

In the event that image sensor 16 is not programmed to capture images at a well-defined, constant frame rate, this prolonged integration time for the rows set to integrate before the readout operation for the previous frame was completed will result in image quality artifacts. The slave trigger mode functions best when the trigger signal transition from 0 to 1 occurs co-incident with the correct frame timing, so all the rows of a subsequent frame receive equal integration time. The slave trigger mode does not produce artifact-free images when the frame rate is varied. Because the transition of trigger signal 21 from 0 to 1 commences a readout operation, the period 121 between trigger signal 21 transitions should be slightly longer than the time it takes to perform the readout operation for a frame.

Figure 7A:
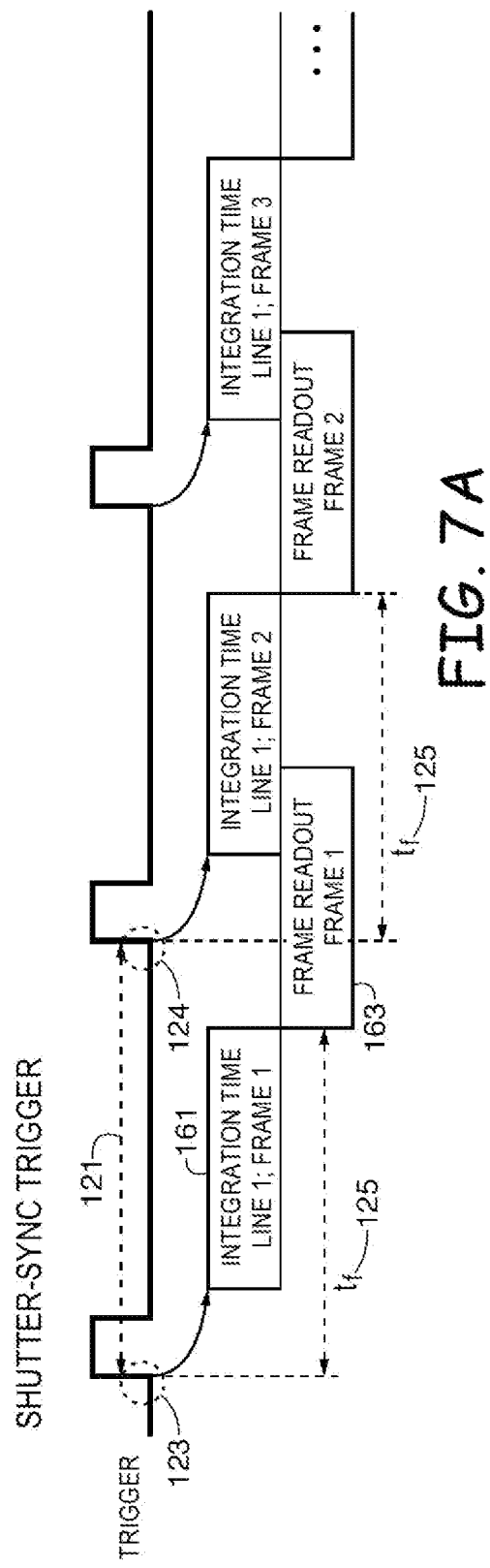
FIG. 7A is a timing diagram illustrative of a shutter-sync trigger response in accordance with embodiments of the present invention.

FIG. 7A illustrates the response of an image sensor 16 to a shutter-sync trigger in accordance with embodiments of the present invention. When trigger signal 21 transitions from 0 to 1 as shown in event 123, there is a constant delay 125 before frame readout 163 occurs. This constant delay is the frame time, or the inverse of the frame rate of the image sensor 16. The integration 161 of line 1, frame 1 is timed such that the integration will finish when the readout 163 is scheduled to occur. Subsequent rows begin integration such that they will complete integration just as the previous row completes its readout. The successive integration of rows is never halted after a frame has been read out, in anticipation of a trigger transition, as is the case in the slave trigger mode of FIG. 6. Consequently, the associated image quality artifacts are avoided.

Figure 7B:
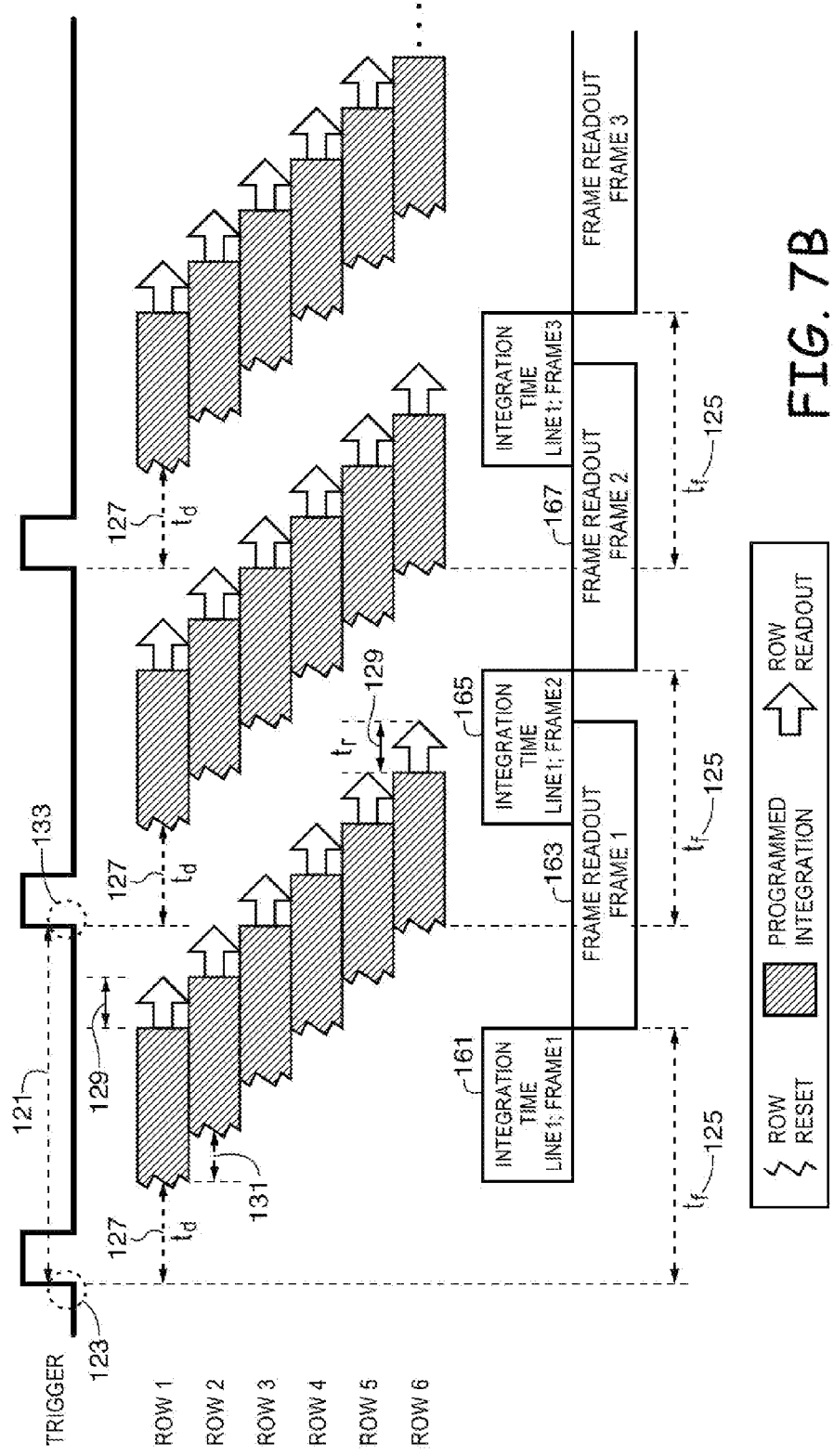
FIG. 7B is a detailed timing diagram illustrative of the reset, integration, and readout operations of individual rows in the shutter-sync trigger response of FIG. 7A in accordance with embodiments of the present invention.

FIG. 7B details the shutter-sync trigger response introduced in FIG. 7A. In the illustrative diagram of FIG. 7B, the image to be readout comprises 6 lines or rows of imaging pixels 15. The response to a trigger signal that transitions during frame readout, such as event 133 is able to produce a deterministic response such as event 167, unlike the constant delay trigger mode of FIG. 5. This deterministic response is independent of the integration time.

The timing of the successive integration of rows is clearly visible in FIG. 7B. A delay time 127 is calculated by subtracting from frame time 125 the programmed length of integration such as the length of event 161. The frame time 125 may be the inverse of the frame rate of the image sensor. Row 1 is reset and begins integrating once delay time 127 has elapsed following the trigger transition from 0 to 1 shown by event 123. Row 2 is reset and set to integrate after delay time 131 has elapsed from the time row 1 was set to integrate. Delay time 131 is introduced to offset the integration so the readout time 129 of row 1 can elapse before row 2 is ready to be readout. Delay time 131 may be equal to readout time 129.

As demonstrated by the overlap of events 163 and 165, readouts can be in parallel with the next frame integration time, which maximizes the amount of integration time a system can allow without affecting the frame rate of the image sensor 16. This ability is useful for imaging low-light scenes, where longer integration times may be necessary.

If exposure changes are desired during the operation of the imaging sensor, the changes will be deterministic in the shutter-sync trigger mode. The changes to registers controlling the integration time and related parameters will always take two frames to be reflected in the imaging process. The shutter-sync trigger mode also allows the system or user to vary the frame rate, by varying the trigger signal period, without the image quality artifacts encountered in the slave trigger mode of FIG. 6. The period 121 between trigger signal 21 transitions should be slightly longer than the time to readout a frame.

Figure 8:
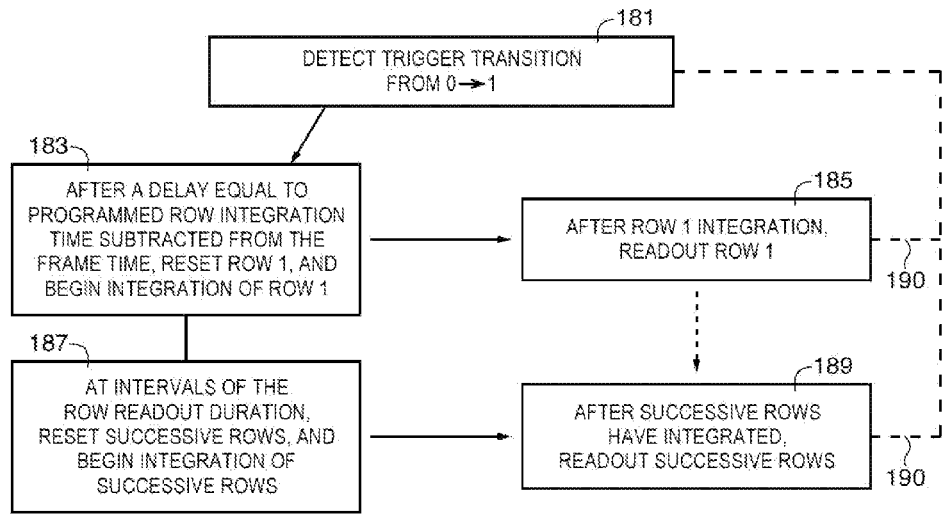
FIG. 8 is a flowchart of illustrative steps involved in the shutter-sync trigger response of FIGS. 7A and 7B in accordance with embodiments of the present invention.

FIG. 8 illustrates the steps of the shutter-sync trigger mode in an illustrative flowchart representation. Step 181 corresponds to the timing and control circuit 206 (FIG. 3) detecting a transition in trigger signal 21 from 0 to 1. Step 183 describes the calculation of the delay 127 to begin row 1 integration as the row integration time (duration of event 161, FIG. 7B) subtracted from the frame time (duration 125, FIG. 7B). As row 1 finishes its programmed integration period, it is read out in step 185. At intervals of the readout time 129, successive rows are reset and set to begin integration as shown by step 187. An example of such an interval is duration 131 (FIG. 7B). As successive rows complete integration, they are readout, as shown in step 189. Transition 190 illustrates that feature of the shutter-sync trigger mode to detect and act upon a trigger signal transition from 0 to 1 during the frame readout processes illustrated by steps 185 and 189.

Figure 9:
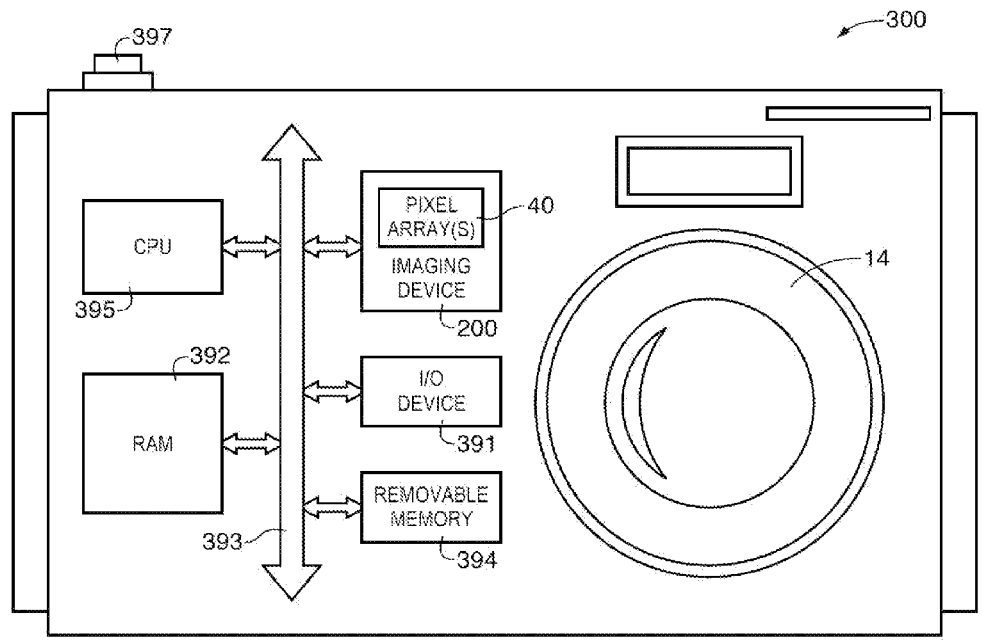
FIG. 9 is a block diagram of an imager employing one or more embodiments of FIGS. 1-3 in accordance with embodiments of the present invention.

FIG. 9 shows in simplified form a typical processor system 300, such as a digital camera, which includes an imaging device such as imaging device 200 which may be, for example a multi-camera imaging system with one or more pixel arrays 40. Device 200 may comprise the elements of device 10 (FIG. 1) or any relevant subset of the elements. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens or multiple lenses indicated by lens 14 for focusing an image onto a pixel array or multiple pixel arrays such as pixel array 40 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems including single or multiple camera modules controlled by a shutter-sync trigger control signal. The shutter-sync trigger control signal may be shared between the one or more image sensors contained in single or multiple camera modules. Alternatively, a unique shutter-sync trigger control signal for each image sensor may be generated by device control and timing circuitry. The trigger control signal period may be varied in response to a user input, the optimal operating conditions of the pixel array of an image sensor, control conditions imposed by processing circuitry such as expected or desired frame rate, or other reasons. The frame rate of the image sensor may be varied for similar reasons. The one or more image sensors may be composed of pixels that are sensitive to light outside the visible spectrum.

The pixels on the one or more image sensors may be integrated for predetermined integration periods appropriate to the desired image output, pixel sensitivity, frame rate constraints, or other reasons. The image sensors configured to respond to a shutter-sync trigger control signal may vary this integration time without influencing the timing of the readout operation. The image sensors configured to respond to a shutter-sync trigger control signal may be able to achieve fast frame rates as the pixel readout of a current frame can be in parallel with the next frame integration period.

The delay between the trigger signal transition and the start of the first integration time may be determined by the frame period which is the inverse of the frame rate. Timing and control circuitry present on the image sensor may begin integration of a first row or a first desired subset of the total pixels, such that the readout can begin one frame period or another desired period after the trigger signal transition. Timing and control circuitry may begin integration of a second row or a second desired subset of the total pixels, such that the readout of the second row or desired subset takes place immediately or shortly after the readout of the first row or desired subset of pixels.

Pixels used to form the image of a frame may integrate for a predetermined integration period after a single trigger control signal transition has been detected, without the chance of integrating beyond that period. This feature may allow the system or user to vary the period between trigger control signals without generating image quality artifacts such as those that result from over integration of a subset of pixels.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an image sensor having pixels, comprising:
   detecting a first trigger control signal transition;
   resetting and integrating the pixels after a first duration of time from the first trigger control signal transition;
   in response to detecting the first trigger control signal transition, commencing read out from the pixels after a second duration of time from the first trigger control signal transition that is greater than zero;
   and detecting and responding to a second trigger control signal transition that is subsequent to the first trigger control signal transition while reading out from the pixels, wherein the image sensor finishes reading out from at least some of the pixels before detecting the second trigger control signal transition, and wherein there are no additional trigger control signal transitions in between the detected first and second trigger control signal transitions.

2. The method defined in claim 1, wherein the image sensor is operated at a frame rate, and wherein the first duration is based on the inverse of the frame rate.

3. The method defined in claim 2, further comprising:
   integrating the pixels for a predetermined integration period, wherein the first duration is based on the predetermined integration period.

4. The method defined in claim 1, further comprising:
   integrating the pixels for a predetermined integration period, wherein the first duration is based on the predetermined integration period.

5. The method defined in claim 1, wherein the image sensor is operated at a frame rate, and wherein the second duration is based on the inverse of the frame rate.

6. The method defined in claim 1, wherein the image sensor is operated at a frame rate, and wherein the second duration is equal to the inverse of the frame rate.

7. The method defined in claim 1, wherein the image sensor is operated at a frame rate, and wherein the first trigger control signal and the second trigger control signal are separate by a time period that is greater than the inverse of the frame rate.

8. The method defined in claim 1, wherein responding to the second trigger control signal transition while reading out from the pixels comprises integrating the pixels for a subsequent frame.

9. An image sensor, comprising:
   a plurality of pixels;
   timing and control circuitry that receives a trigger signal and that detects a first transition in the trigger signal;
   row control circuitry that resets and integrates the plurality of pixels after a first duration of time from the detected first transition to capture a first frame of image data; and
   column control circuitry that reads the first frame of image data out from the pixels in response to the detected first transition, wherein the column control circuitry starts to read the first frame of image data out from the pixels after a second duration of time from the detected first transition that is greater than zero, wherein the timing and control circuitry is configured to detect and respond to a second transition in the trigger signal while the column control circuitry is reading data out from the pixels, wherein the row control circuitry is configured to reset and integrate the plurality of pixels after the first duration of time from the detected second transition to capture a second frame of image data that is subsequent to the first frame of image data, wherein the first and second frames of image data are sequential, and wherein the row control circuitry is finished reading out at least some of the first frame of image data before detecting the second transition.

10. The image sensor defined in claim 9, wherein the image sensor is operated at a frame rate, wherein the row control circuitry is configured to reset and integrate the plurality of pixels after the first duration that is based on the inverse of the frame rate.

11. The image sensor defined in claim 9, wherein the row control circuitry is configured to reset and integrate a first subset of the plurality of pixels at the same time the column circuitry reads data out from a second subset of the plurality of pixels that is different than the first subset.

12. The image sensor defined in claim 9, wherein the image sensor is operated at a frame rate, wherein the timing and control circuitry configures the frame rate of the image sensor.

13. The image sensor defined in claim 9, wherein the row control circuitry is configured to integrate the plurality of pixels for a predetermined integration period.

14. The image sensor defined in claim 13, wherein the timing and control circuitry is configured to determine the predetermined integration period.

15. The image sensor defined in claim 13, wherein the image sensor is operated at a variable frame rate, and wherein the row control circuitry is configured to integrate the plurality of pixels for no longer than the predetermined integration period when the frame rate is varied.

16. A system, comprising:
   a central processing unit;
   memory;
   input-output circuitry; and
   an imaging device, comprising:
      one or more lenses;
      device control and timing circuitry that outputs trigger control signals; and
      a plurality of image sensors, wherein the plurality of image sensors comprises first and second image sensors, wherein the first image sensor is operated at a first frame rate, wherein the second image sensor is operated at a second frame rate that is different from the first frame rate, and wherein each of the first and second image sensors comprises:
         a plurality of pixels;
         timing and control circuitry that receives a trigger signal and that detects a first transition in the trigger signal;
         row control circuitry that resets and integrates the plurality of pixels after a first duration of time from the detected first transition, wherein the first duration in the first image sensor is based on the inverse of the first frame rate and wherein the first duration in the second image sensor is based on the inverse of the second frame rate; and
         column control circuitry that reads data out from the pixels after a second duration of time from the detected first transition, wherein the second duration of time is greater than the first duration of time, wherein the timing and control circuitry is configured to detect and respond to a second transition in the trigger signal while the column control circuitry is reading data out from the pixels, wherein the row control circuitry finishes integrating at least some of the plurality of pixels before detecting the second transition, wherein the detected second transition is subsequent to the detected first transition, and wherein the timing and control circuitry does not detect any additional transitions in the trigger signal between the detected first and second transitions.

17. The system defined in claim 16, wherein the timing and control circuitry in the first image sensor outputs a first trigger control signal and the timing and control circuitry in the second image sensor outputs a second trigger control signal that is different from the first trigger control signal.

18. The system defined in claim 16, wherein the plurality of pixels in the first and second image sensors is sensitive to light outside of the visible spectrum.

19. The system defined in claim 16, wherein the row control circuitry in the first image sensor resets and integrates the plurality of pixels in the first image sensor for a first predetermined integration period and the row control circuitry in the second image sensor resets and integrates the plurality of pixels in the second image sensor for a second predetermined integration period that is different from the first predetermined integration period.

20. The method defined in claim 1, wherein the image sensor is operated at a frame rate, and wherein the second duration of time is less than the inverse of the frame rate.

* * * * *